(12) United States Patent
Hanham et al.

(10) Patent No.: US 11,847,037 B2
(45) Date of Patent: Dec. 19, 2023

(54) DEVICE AND METHOD FOR HIGH PERFORMANCE MEMORY DEBUG RECORD GENERATION AND MANAGEMENT

(71) Applicant: KIOXIA CORPORATION, Tokyo (JP)

(72) Inventors: Paul Edward Hanham, Abingdon (GB); Shigehiro Asano, Abingdon (GB); Julien Margetts, Abingdon (GB)

(73) Assignee: KIOXIA CORPORATION, Tokyo (JP)

( * ) Notice: Subject to any disclaimer, the term of this patent is extended or adjusted under 35 U.S.C. 154(b) by 178 days.

(21) Appl. No.: 17/022,943

(22) Filed: Sep. 16, 2020

(65) Prior Publication Data

US 2022/0083442 A1 Mar. 17, 2022

(51) Int. Cl.
*G06F 11/00* (2006.01)
*G06F 11/30* (2006.01)
(Continued)

(52) U.S. Cl.
CPC ........ *G06F 11/3075* (2013.01); *G06F 3/0619* (2013.01); *G06F 3/0659* (2013.01);
(Continued)

(58) Field of Classification Search
CPC ............. G06F 11/3075; G06F 11/3037; G06F 11/3656
See application file for complete search history.

(56) References Cited

U.S. PATENT DOCUMENTS 6,661,534 B1 12/2003 Ravi et al.
2005/0223410 A1 10/2005 Li et al.
(Continued)

FOREIGN PATENT DOCUMENTS

CN 102439576 A 5/2012
CN 103930944 B 8/2016
(Continued)

*Primary Examiner* — Philip Guyton
(74) *Attorney, Agent, or Firm* — Foley & Lardner LLP

(57) ABSTRACT

Example implementations include a method of receiving a host command identifier associated with a host command, determining a device command associated with the host command and a memory controller device, receiving a device command timestamp corresponding to a time of the determining the device command, and determining a debug record contemporaneously with the determining the device command, the debug record including the host command identifier, a device command identifier associated with the device command, and the device command timestamp. Example implementations also include a device operably coupled to a memory array, and with a memory controller device configured to receive a host command identifier associated with a host command, and configured to determine a device command associated with the host command and a memory controller device, and a debug record generator device operatively coupled to the memory controller device and configured to receive a device command timestamp corresponding to a time of the determined device command, and configured to determine a debug record contemporaneously with the determining the device command, the debug record including the host command identifier, a device command identifier associated with the device command, and the device command timestamp.

20 Claims, 8 Drawing Sheets

(51) Int. Cl.
*G06F 11/32* (2006.01)
*G06F 3/06* (2006.01)
*G06F 11/36* (2006.01)

(52) U.S. Cl.
CPC ........ *G06F 3/0683* (2013.01); *G06F 11/3037* (2013.01); *G06F 11/328* (2013.01); *G06F 11/3656* (2013.01)

(56) References Cited

U.S. PATENT DOCUMENTS

| | | | |
|---|---|---|---|
| 2007/0078865 A1 | 4/2007 | Smith | |
| 2016/0013992 A1 | 1/2016 | Reddy et al. | |
| 2016/0018998 A1* | 1/2016 | Mohan | G06F 3/0616 |
| | | | 711/103 |
| 2017/0177241 A1 | 6/2017 | Erickson et al. | |
| 2018/0293000 A1 | 10/2018 | Ross et al. | |
| 2020/0117392 A1 | 4/2020 | Schaefer et al. | |
| 2021/0019218 A1* | 1/2021 | Zhu | G06F 11/073 |
| 2022/0083442 A1* | 3/2022 | Hanham | G06F 11/3093 |

FOREIGN PATENT DOCUMENTS

| | | |
|---|---|---|
| CN | 110843867 A | 2/2020 |
| EP | 3 531 321 B1 | 8/2020 |
| TW | I546692 B | 8/2016 |

\* cited by examiner

DEVICE AND METHOD FOR HIGH PERFORMANCE MEMORY DEBUG RECORD GENERATION AND MANAGEMENT

TECHNICAL FIELD

The present implementations relate generally to electronic memory devices, and more particularly to high-performance memory debug record generation and management.

BACKGROUND

Recording accurate and complete activity of electronic memory devices and components thereof is critical to developing electronic devices with high performance characteristics. Such high performance characteristics can include reliability, speed, and capacity. However, conventional systems may not effectively record accurate and complete activity of electronic memory devices and components thereof, or may do so by significantly impacting reliability and speed of a memory device. Thus, a technological solution for high-performance memory debug record generation and management is desired.

SUMMARY

Example implementations include a method of receiving a host command identifier associated with a host command, determining a device command associated with the host command and a memory controller device, receiving a device command timestamp corresponding to a time of the determining the device command, and determining a debug record contemporaneously with the determining the device command, the debug record including the host command identifier, a device command identifier associated with the device command, and the device command timestamp.

Example implementations also include a device operably coupled to a memory array, and with a memory controller device configured to receive a host command identifier associated with a host command, and configured to determine a device command associated with the host command and a memory controller device, and a debug record generator device operatively coupled to the memory controller device and configured to receive a device command timestamp corresponding to a time of the determined device command, and configured to determine a debug record contemporaneously with the determining the device command, the debug record including the host command identifier, a device command identifier associated with the device command, and the device command timestamp.

Example implementations also include a non-transitory computer-readable medium storing computer-readable instructions, such that when executed, causes a processing circuit to receive a host command identifier associated with a host command, determine a device command associated with the host command and a memory controller device, receive a device command timestamp corresponding to a time of the determining the device command, and determine a debug record contemporaneously with the determining the device command, the debug record including the host command identifier, a device command identifier associated with the device command, and the device command timestamp.

BRIEF DESCRIPTION OF THE DRAWINGS

These and other aspects and features of the present implementations will become apparent to those ordinarily skilled in the art upon review of the following description of specific implementations in conjunction with the accompanying figures below.

DETAILED DESCRIPTION

Figure 1:
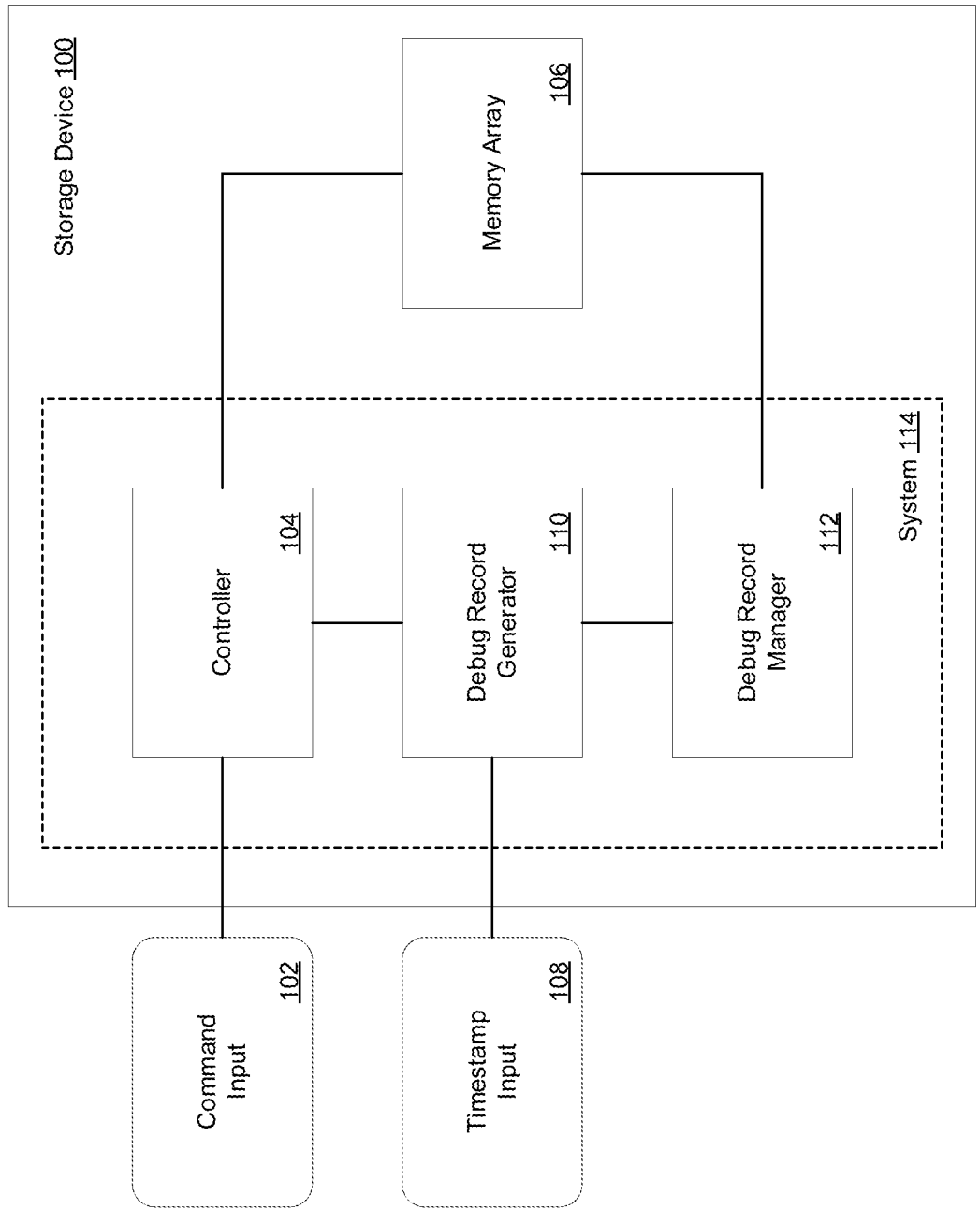
FIG. 1 illustrates an example storage device in accordance with present implementations.

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single embodiment, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

In some implementations, complex integrated electronic devices include many separate logical functions which are connected in a pipeline or in series to perform a sequence of actions. In some implementations, each logical function processes a single item of work at any one time, while the pipeline as a whole can process multiple discrete items of work, as each function receives a new item of work from the previous functions and passes a finished item of work to the next function in sequence. In some implementations, in order to assist the debugging of problems that occur in the pipeline, each process individually logs its respective activity in an event log with timestamps. In some implementations, for any given item of work, progress associated with multiple processes through the pipeline is recorded in multiple individual event logs, with one log for each separate process. In some implementations, each logged event records an identifier for the item, a timestamp and other data relevant to the event that occurred. In a high speed pipeline, processing many thousands or millions of work items, can require a significant amount of storage space to store the logs. In some implementations, the required storage space includes a significant volume of volatile memory. In some implementations, the required storage space includes a significant amount of DRAM. In some implementations, where the volatile memory is also used for other purposes by the logical functions in the pipeline, the logging of events can also 'steal' memory I/O bandwidth that causes the pipeline itself to operate more slowly than it would otherwise be capable of doing. Thus, it is advantageous to provide a technological solution for logging in integrated electronic devices while reducing or eliminating requirements for additional memory storage and impacts of reduced performance from shared bandwidth for operating and logging processes.

Arrangements in accordance with present implementations disclosed and described herein include event logging schemes in integrated electronic devices that minimize the memory storage required for event logs and reduce the loss of memory I/O bandwidth due to event logging. In some implementations, rather than individual event logs being written by separate logical functions within the device, events from multiple logical processes are combined, coalesced, or the like, into a single log entry by removing repeated information from the individual events into a single log entry. In some implementations, repeated information includes but is not limited to an identifier associated with a work item being processed by the logical functions within the integrated electronic device. In some implementations, writing such a smaller event log to memory consumes a smaller amount of the available I/O bandwidth of the memory, as well as consuming less space in the memory itself. In some implementations, the smaller amount of consumed I/O bandwidth allows the device to suffer less performance degradation for its normal work item processing when performing event logging. In some implementations, the lower amount of memory consumption reduces the cost of the device as less memory needs to be provided to support event logging.

FIG. 1 illustrates an example storage device 100 in accordance with present implementations. As illustrated by way of example in FIG. 1, the storage device 100 includes a system 114 and a memory array 106. In some implementations, the system 114 includes a command input 102 and a timestamp input 108. In some implementations a clock is maintained and a timestamp generated within the storage device 100. In some implementations, the system 114 includes a controller 104 a debug record generator 110, and a debug record manager 112.

The command input 102 is operable to provide a host command to the system 114 from a host computer (not shown for clarity) to perform one or more operations with respect to the memory array. In some implementations, the command input 102 is operable to provide at least one of a memory access command and a memory operability command to the system 114, for instructions the memory array 106 to conduct one or more memory access activities or memory operability activities. In some implementations, the command input comprises a high level memory read command, a high level memory write command, or the like. In some implementations, the command input includes a diagnostic command, a configuration command, a calibration command, or the like. In some implementations, at least one of configuration, calibration, or the like includes configuration or calibration of one or more physical or logical memory locations of the memory array. In some implementations, at least one of configuration, calibration, or the like includes configuration or calibration of one or more components of the system 114. In some implementations, the command input includes logic, devices, interfaces, or the like to generate the host command. By way of example, a command input is generated in response to receiving one or more of a fetch command from a submission queue, removing a device command from a queue, starting a memory access operation, detecting a memory reliability or availability change, starting any memory diagnostic operation, completing any memory diagnostic operation, starting execution of a host command, and completing execution of a host command. In some implementations, the command input includes logic, devices, interfaces, or the like to receive the host command from at least one of an external device, system, user, or the like. In some implementations, the command input 102 includes an interface, input, coupling, connection, adapter, header, or the like.

The timestamp input 108 is operable to provide a timestamp to the system 114 to indicate time of a particular event associated with the system 114. In some implementations, the timestamp input is operable to provide an absolute timestamp, including but not limited to, a UNIX timestamp. In some implementations, the timestamp input 108 is operable to provide the timestamp to the system 114 asynchronously of any device or clock of any device or component of the system 114. In some implementations, the timestamp input is operable to provide a timestamp with a granularity of at least 1 microsecond. In some implementations, the timestamp input 108 is operable to provide a reference timestamp to the system 114 synchronously, in coordination, or the like, with at least one device or clock of any device or component of the system 114. In some implementations the system 114 maintains an independent clock and internally generates its own timestamps, referenced from the timestamp input 108 by using the timestamp input 108 to set a starting time for the clock. In some implementations, the timestamp input 108 includes an interface, input, coupling, connection, adapter, header, or the like.

The memory array 106 is operative to store data including, but not limited to debug data received from the system 114. In some implementations, the memory array 106 includes one or more hardware memory devices for storing binary data, digital data, or the like. In some implementations, the memory array 106 includes one or more electrical components, electronic components, programmable electronic components, reprogrammable electronic components, integrated circuits, semiconductor devices, flip flops, arithmetic units, or the like. In some implementations, the memory array 106 includes at least one of a non-volatile memory device, a volatile memory device, a solid-state memory device, a random access memory (RAM) device, a flash memory device, and a NAND memory device. In some implementations, the memory array 106 includes one or more addressable memory regions disposed on one or more physical memory arrays. In some implementations, a physical memory array includes a NAND gate array disposed on a particular semiconductor device, integrated circuit device, printed circuit board device, and the like. In some implementations, the memory array 106 includes a volatile memory device and a non-volatile memory device, where the volatile memory device acts as a cache or buffer to store and retrieve data at a high I/O bandwidth and the cached data is periodically flushed to the non-volatile memory.

The controller 104 is operable to transfer data to and from the memory array 106. In some implementations, the controller 104 is further operable to configure, calibrate, or the like one or more physical or logical memory locations of the memory array 106. In some implementations, the controller 104 is further operable to configure, calibrate, or the like one or more components of the system 114. In some implementations, the controller 104 includes one or more logic devices for controlling or interacting with the memory array 106. In some implementations, the controller 104 includes one or more electrical components, electronic components, programmable electronic components, reprogrammable electronic components, integrated circuits, semiconductor devices, flip flops, arithmetic units, or the like.

The debug record generator 110 is operable to record one or more device commands and host commands from the controller 104. In some implementations, the debug record generator is operable to passively monitor one or more inputs and outputs of the controller 104 and device and components thereof. In some implementations, the debug record generator 110 is operatively coupled to a dedicated communication line, bus, or the like between the controller 104 and the memory array 106. In some implementations, the debug record generator 110 includes a plurality of terminals operatively coupled to one or more device or components of the controller 104. Thus, in some implementations, the debug record generator 110 is operable to passively monitor output from one or more devices of the controller 104 while minimizing computing resources of the controller 104 and hardware modifications required to support communication with the debug record generator 110. As one example minimizing computing resources includes minimizing latency of recording timestamps in response to device command activity. It is to be understood that the debug record generator 110 is operative to be coupled directly to one or more devices or components of the controller 104 either directly or indirectly through one or more communication lines, buses, or the like, in accordance with present implementations. In some implementations, the debug record generator 110 includes one or more electrical components, electronic components, programmable electronic components, reprogrammable electronic components, integrated circuits, semiconductor devices, flip flops, arithmetic units, or the like.

The debug record manager 112 is operable to communicate one or more debug records to the memory array 106. In some implementations, the debug record manager 112 is operable to serialize, sort, organize, or the like, one or more debug records received from or associated with the debug record manager. In some implementations, the debug record manager 112 is operable to serialize, sort, organize, or the like, one or more debug records contemporaneously, concurrently, or the like, with normal operation of the memory device. Thus, in some implementations, the debug record manager 112 is operable to capture, organize and store debug records concurrently, contemporaneously, or the like, with operation of the debug record generator 110 and the system 114.

Figure 2:
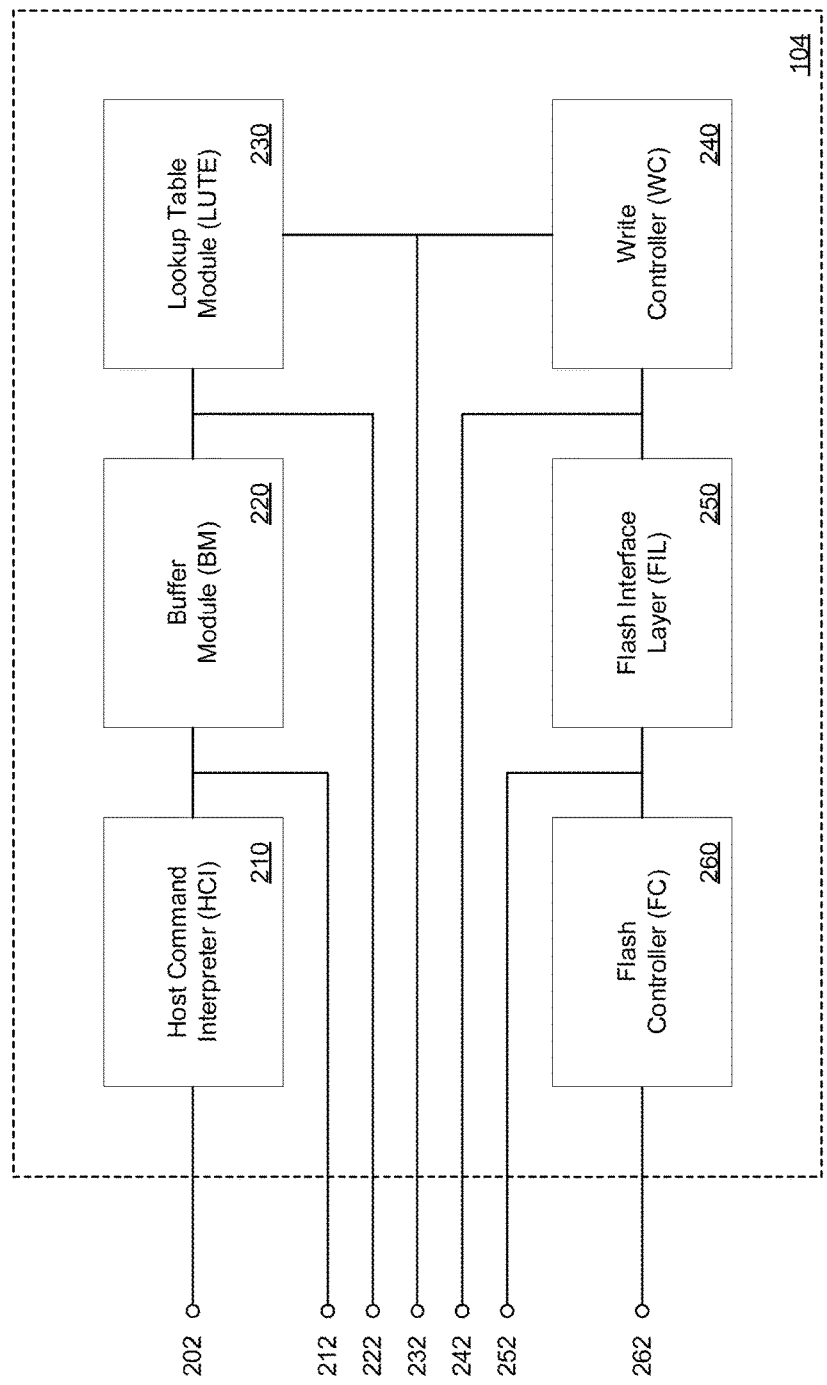
FIG. 2 illustrates an example controller in accordance with the example system of FIG. 1.

FIG. 2 illustrates an example controller in accordance with the example system of FIG. 1. As illustrated by way of example in FIG. 2, an example controller 200 includes a host command input node 202, a host command interpreter (HCI) 210 operatively coupled to an HCI snoop node 212, a buffer module (BM) 220 operatively coupled to a BM snoop node 222, a lookup table device (LUTE) 230 operatively coupled to a LUTE snoop node 232, a write controller (WC) 240 operatively coupled to a WC snoop node 242, a flash interface layer device (FIL) 250 operatively coupled to a FIL snoop node 252, and a flash controller (FC) 260 operatively coupled to an operating memory node 262. In some implementations, the controller 104 includes the example controller 200. It is to be understood that the example controller 200 and the example controller 104 can include more or fewer devices therein for effecting communication with and control of the memory array 106. It is to be further understood that any additional components of the example controller 200 and the example controller 104 can be operatively coupled to a corresponding snoop node. It is to be understood that one or more of the snoop nodes 212, 222, 232, 242 and 252 can include one or more communication lines, buses or the like. It is to be understood that the example debug record generator 300 and the debug record generator 110 can optionally include one or more of the HCI snoop filter 312, the BM snoop filter 322, the LUTE snoop filter 332, the WC snoop filter 342, and the FIL snoop filter 352.

The HCI 210 is operable to receive, communicate, interpret, and the like, one or more host commands from the command input 102 by the host command input node 202. In some implementations, the HCI 210 is operable to generate one or more device commands based on one or more host commands received from the command input 102. In some implementations, the HCI 210 is operable to provide one or more instructions based on the received host commands to one or more of the BM 220, the LUTE 230, the WC 240, the FIL 250, and the FC 260. In some implementations, the HCI 210 is operatively coupled to one or more of the BM 220, the LUTE 230, the WC 240, the FIL 250, and the FC 260 by one or more communication lines, buses, or the like. In some implementations, the HCI 210 includes an NVMe device. It is to be understood that the HCI 210 is not limited to including an NVMe device. In some implementations, the HCI snoop node 212 is operatively coupled to an output node, bus, or the like, of the HCI 210. In some implementations, the HCI snoop node 212 is operatively coupled to an output of the HCI 210 and an input of the BM 220. In some implementations, the HCI 210 is operable to export or transmit a debug log from the memory array 106 to an external device or system in response to a retrieval command. As one example a retrieval command includes a host command for a read operation from the memory 106. In some implementations, the HCI 210 includes one or more electrical components, electronic components, programmable electronic components, reprogrammable electronic components, integrated circuits, semiconductor devices, flip flops, arithmetic units, or the like.

The BM 220 is operable to temporarily store data received at the HCI 210 or the command input 102. In some implementations, the BM 220 is operable to receive data from and to transmit data to the HCI 210. In some implementations, the HCI 210 is operable to read data stored in the BM 220 and transmit data stored in the BM 220 in response to a host command received from the command input 102. As one example, the HCI may transmit data externally via one or more communication lines in response to a host command requesting data from the memory array 106 that has not yet been stored in the memory array 106 from the BM 220. In some implementations, the BM snoop node 222 is operatively coupled to an output node, bus, or the like, of the BM 220. In some implementations, the BM snoop node 222 is operatively coupled to an output of the BM 220 and an input of the LUTE 230. In some implementations, the BM 220 includes one or more electrical components, electronic components, programmable electronic components, reprogrammable electronic components, integrated circuits, semiconductor devices, flip flops, arithmetic units, or the like. The LUTE 230 is operable to provide one or more memory array addresses, functions, or the like. In some implementations, the LUTE snoop node 232 is operatively coupled to an output node, bus, or the like, of the LUTE 230. In some implementations, the LUTE snoop node 232 is operatively coupled to an output of the LUTE 230 and an input of the WC 240. In some implementations, the LUTE 230 includes one or more electrical components, electronic components, programmable electronic components, reprogrammable electronic components, integrated circuits, semiconductor devices, flip flops, arithmetic units, or the like.

The WC 240 is operable to generate one or more write commands, read commands, or the like, in response to one or more host commands. In some implementations, the WC snoop node 242 is operatively coupled to an output node, bus, or the like, of the WC 240. In some implementations, the WC snoop node 242 is operatively coupled to an output of the WC 240 and an input of the FIL 250. In some implementations, the WC 240 includes one or more electrical components, electronic components, programmable electronic components, reprogrammable electronic components, integrated circuits, semiconductor devices, flip flops, arithmetic units, or the like. The FIL 250 is operable to generate one or more flash commands compatible with the memory array 106, in response to one or more write commands received from the write controller 240. In some implementations, the FIL snoop node 252 is operatively coupled to an output node, bus, or the like, of the FIL 252. In some implementations, the FIL snoop node 252 is operatively coupled to an output of the FIL 250 and an input of the FC 260. In some implementations, the FIL 250 includes one or more electrical components, electronic components, programmable electronic components, reprogrammable electronic components, integrated circuits, semiconductor devices, flip flops, arithmetic units, or the like. The FC 260 is operable to generate one or more memory array commands based on one or more flash commands received from the FIL 250. In some implementations, the FC 260 includes one or more electrical components, electronic components, programmable electronic components, reprogrammable electronic components, integrated circuits, semiconductor devices, flip flops, arithmetic units, or the like.

Figure 3:
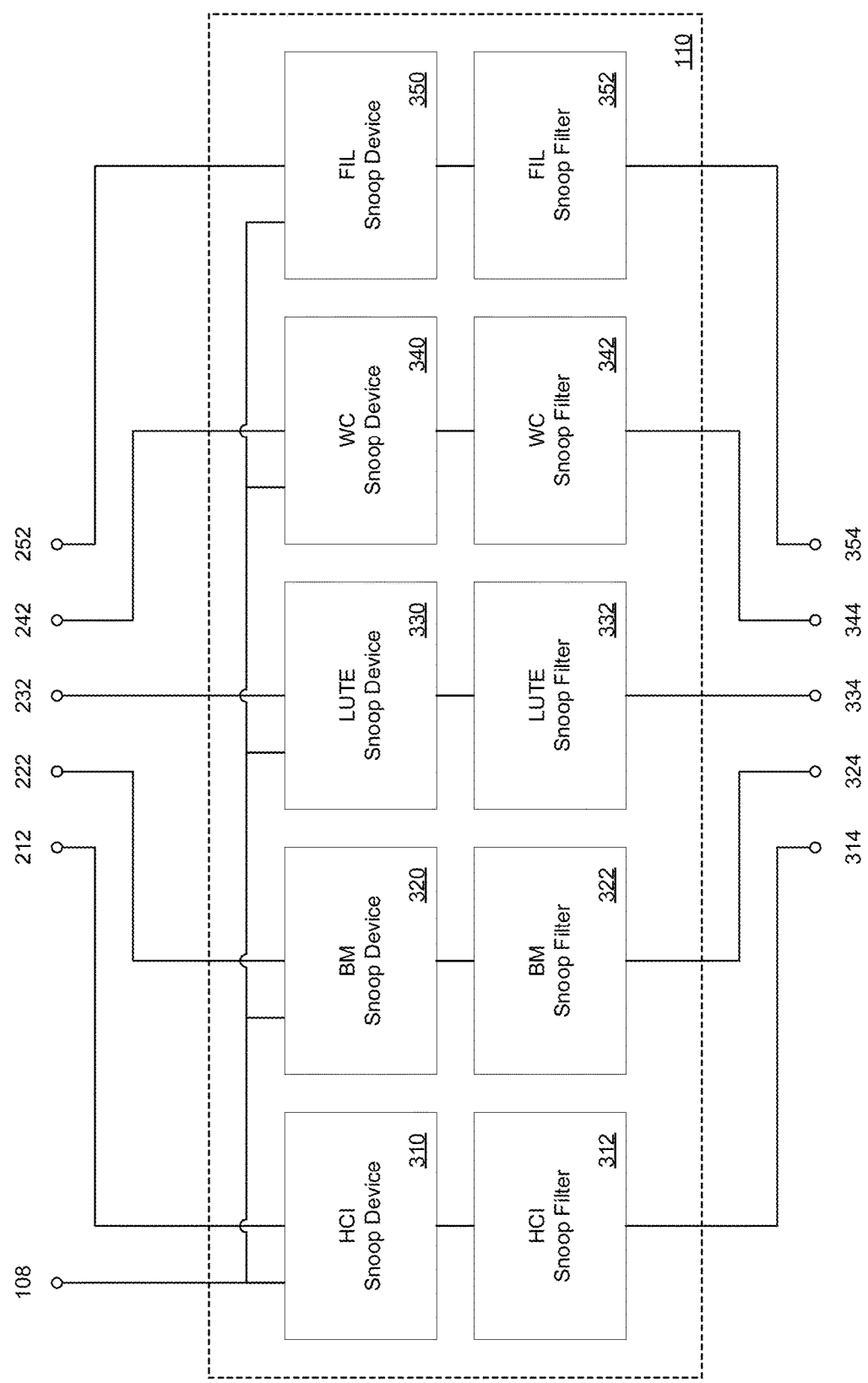
FIG. 3 illustrates an example debug record generator in accordance with the example system of FIG. 1.

FIG. 3 illustrates an example debug record generator in accordance with the example system of FIG. 1. As illustrated by way of example in FIG. 3, an example debug record generator 300 includes an HCI snoop device 310 operatively coupled to the HCI snoop node 212, a BM snoop device 320 operatively coupled to the BM snoop node 222, a LUTE snoop device 330 operatively coupled to the LUTE snoop node 232, a WC snoop device 340 operatively coupled to the WC snoop node 242, and a FIL snoop device 250 operatively coupled to the FIL snoop node 252. The example debug record generator 300 further includes an HCI snoop filter 312 operatively coupled to the HCI snoop device 310 and an HCI log node 314, a BM snoop filter 322 operatively coupled to the BM snoop device 320 and a BM log node 324, a LUTE snoop filter 332 operatively coupled to the LUTE snoop device 330 and a LUTE log node 334, a WC snoop filter 342 operatively coupled to the WC snoop device 340 and a WC log node 344, and a FIL snoop filter 352 operatively coupled to the FIL snoop device 350 and a FIL log node 352. In some implementations, the debug record generator 110 includes the example debug record generator 300.

The HCI snoop device 310 is operable to detect device command output from the HCI snoop node 212, and to receive a timestamp from the timestamp input 108. In some implementations, the HCI snoop device 310 is operable to determine, generate, or the like, at least one HCI debug record. In some implementations, the HCI debug record includes a host command associated with the HCI device command and received from the command input 102, a timestamp recorded from the timestamp input 108, and a device identifier of the HCI snoop device 310. In some implementations, the recorded timestamp corresponds to a time of receiving the HCI device command at the HCI snoop device 310. Thus, in some implementations, the HCI snoop device 310 creates at least one HCI debug record identifying an HCI device command, a host command triggering the HCI device command, and a time of receipt of the HCI device command. In some implementations, the HCI snoop device 310 generates the HCI debug record contemporaneously with receiving the HCI device command. In some implementations, the HCI snoop device 310 contemporaneously generates the HCI debug record to minimize delay between receiving the timestamp and receiving the HCI device command, and to maximize accuracy of the time associated with the HCI debug record. In some implementations, the HCI snoop device 310 includes one or more electrical components, electronic components, programmable electronic components, reprogrammable electronic components, integrated circuits, semiconductor devices, flip flops, arithmetic units, or the like.

The BM snoop device 320 is operable to detect device command output from the BM snoop node 222, and to receive a timestamp from the timestamp input 108. In some implementations, the BM snoop device 320 is operable to determine, generate, or the like, at least one BM debug record. In some implementations, the BM debug record includes a host command associated with the BM device command and received from the command input 102, a timestamp recorded from the timestamp input 108, and a device identifier of the BM snoop device 320. In some implementations, the recorded timestamp corresponds to a time of receiving the BM device command at the BM snoop device 320. Thus, in some implementations, the BM snoop device 320 creates at least one BM debug record identifying a BM device command, a host command triggering the BM device command, and a time of receipt of the BM device command. In some implementations, the BM snoop device 320 generates the BM debug record contemporaneously with receiving the BM device command. In some implementations, the BM snoop device 320 contemporaneously generates the BM debug record to minimize delay between receiving the timestamp and receiving the BM device command, and to maximize accuracy of the time associated with the BM debug record. In some implementations, the BM snoop device 320 includes one or more electrical components, electronic components, programmable electronic components, reprogrammable electronic components, integrated circuits, semiconductor devices, flip flops, arithmetic units, or the like.

The LUTE snoop device 330 is operable to detect device command output from the LUTE snoop node 232, and to receive a timestamp from the timestamp input 108. In some implementations, the LUTE snoop device 330 is operable to determine, generate, or the like, at least one LUTE debug record. In some implementations, the LUTE debug record includes a host command associated with the LUTE device command and received from the command input 102, a timestamp recorded from the timestamp input 108, and a device identifier of the LUTE snoop device 330. In some implementations, the recorded timestamp corresponds to a time of receiving the LUTE device command at the LUTE snoop device 330. Thus, in some implementations, the LUTE snoop device 330 creates at least one LUTE debug record identifying a LUTE device command, a host command triggering the LUTE device command, and a time of receipt of the LUTE device command. In some implementations, the LUTE snoop device 330 generates the LUTE debug record contemporaneously with receiving the LUTE device command. In some implementations, the LUTE snoop device 330 contemporaneously generates the LUTE debug record to minimize delay between receiving the timestamp and receiving the LUTE device command, and to maximize accuracy of the time associated with the LUTE debug record. In some implementations, the LUTE snoop device 330 includes one or more electrical components, electronic components, programmable electronic components, reprogrammable electronic components, integrated circuits, semiconductor devices, flip flops, arithmetic units, or the like.

The WC snoop device 340 is operable to detect device command output from the WC snoop node 242, and to receive a timestamp from the timestamp input 108. In some implementations, the WC snoop device 340 is operable to determine, generate, or the like, at least one WC debug record. In some implementations, the WC debug record includes a host command associated with the WC device command and received from the command input 102, a timestamp recorded from the timestamp input 108, and a device identifier of the WC snoop device 340. In some implementations, the recorded timestamp corresponds to a time of receiving the WC device command at the WC snoop device 340. Thus, in some implementations, the WC snoop device 340 creates at least one WC debug record identifying a WC device command, a host command triggering the WC device command, and a time of receipt of the WC device command. In some implementations, the WC snoop device 340 generates the WC debug record contemporaneously with receiving the WC device command. In some implementations, the WC snoop device 340 contemporaneously generates the WC debug record to minimize delay between receiving the timestamp and receiving the WC device command, and to maximize accuracy of the time associated with the WC debug record. In some implementations, the WC snoop device 340 includes one or more electrical components, electronic components, programmable electronic components, reprogrammable electronic components, integrated circuits, semiconductor devices, flip flops, arithmetic units, or the like.

The FIL snoop device 350 is operable to detect device command output from the FIL snoop node 252, and to receive a timestamp from the timestamp input 108. In some implementations, the FIL snoop device 350 is operable to determine, generate, or the like, at least one FIL debug record. In some implementations, the FIL debug record includes a host command associated with the FIL device command and received from the command input 102, a timestamp recorded from the timestamp input 108, and a device identifier of the FIL snoop device 350. In some implementations, the recorded timestamp corresponds to a time of receiving the FIL device command at the FIL snoop device 350. Thus, in some implementations, the FIL snoop device 350 creates at least one FIL debug record identifying an FIL device command, a host command triggering the FIL device command, and a time of receipt of the FIL device command. In some implementations, the FIL snoop device 350 generates the FIL debug record contemporaneously with receiving the FIL device command. In some implementations, the FIL snoop device 350 contemporaneously generates the FIL debug record to minimize delay between receiving the timestamp and receiving the FIL device command, and to maximize accuracy of the time associated with the FIL debug record. In some implementations, the FIL snoop device 350 includes one or more electrical components, electronic components, programmable electronic components, reprogrammable electronic components, integrated circuits, semiconductor devices, flip flops, arithmetic units, or the like.

The HCI snoop filter 312 is operable to receive and filter HCI debug records received from the HCI snoop device 310. In some implementations, the HCI snoop filter 312 determines whether a received HCI debug record satisfies one or more HCI snoop filter criteria for recording or discarding the HCI debug record. In some implementations, the HCI snoop filter criteria include one or more of a device command type, a timestamp or range of timestamps, a host command type, a memory address location, a memory address location range, rate of command transmission, rate of command generation, size of memory to be accessed, and the like. In some implementations, the HCI snoop filter 312 outputs the HCI debug record to the HCI log node 314 only if the HCI debug record satisfies the HCI snoop filter criteria. Alternatively, in some implementations, the HCI snoop filter 312 outputs the HCI debug record to the HCI log node 314 only if the HCI debug record does not satisfy the HCI snoop filter criteria.

In some implementations, the HCI snoop filter 312 is operable to filter HCI debug records contemporaneously with the generation of HCI device records by the HCI snoop device or contemporaneously with the receipt of HCI device commands at the HCI snoop device 310. Thus, the HCI snoop filter 312 is operable to rapidly filter a large volume of HCI debug records to record and store only records which satisfy predetermined HCI snoop filter criteria. This filtering of HCI snoop records at the debug record generator 110 reduces bandwidth of the system 114 dedicated to transmitting HCI debug records to the debug record manager 112 and the amount of physical memory required in the memory array 106 or the number of memory array devices required to record HCI debug records. In some implementations, the HCI snoop filter 312 includes one or more electrical components, electronic components, programmable electronic components, reprogrammable electronic components, integrated circuits, semiconductor devices, flip flops, arithmetic units, or the like.

The BM snoop filter 322 is operable to receive and filter BM debug records received from the BM snoop device 320. In some implementations, the BM snoop filter 322 operates similarly to the HCI snoop filter 312, including but not limited to snoop filter criteria with respect to the BM debug record and the BM log node 324. In some implementations, the BM snoop filter 322 includes one or more electrical components, electronic components, programmable electronic components, reprogrammable electronic components, integrated circuits, semiconductor devices, flip flops, arithmetic units, or the like.

The LUTE snoop filter 332 is operable to receive and filter LUTE debug records received from the LUTE snoop device 330. In some implementations, the LUTE snoop filter 332 operates similarly to the HCI snoop filter 312, including but not limited to snoop filter criteria with respect to the LUTE debug record and the LUTE log node 334. In some implementations, the LUTE snoop filter 332 includes one or more electrical components, electronic components, programmable electronic components, reprogrammable electronic components, integrated circuits, semiconductor devices, flip flops, arithmetic units, or the like.

The WC snoop filter 342 is operable to receive and filter WC debug records received from the WC snoop device 340. In some implementations, the WC snoop filter 340 operates similarly to the HCI snoop filter 312, including but not limited to snoop filter criteria with respect to the WC debug record and the WC log node 344. In some implementations, the WC snoop filter 342 includes one or more electrical components, electronic components, programmable electronic components, reprogrammable electronic components, integrated circuits, semiconductor devices, flip flops, arithmetic units, or the like.

The FIL snoop filter 352 is operable to receive and filter FIL debug records received from the FIL snoop device 352. In some implementations, the FIL snoop filter 352 operates similarly to the HCI snoop filter 312, including but not limited to snoop filter criteria with respect to the FIL debug record and the FIL log node 354. In some implementations, the FIL snoop filter 352 includes one or more electrical components, electronic components, programmable electronic components, reprogrammable electronic components, integrated circuits, semiconductor devices, flip flops, arithmetic units, or the like.

Figure 4:
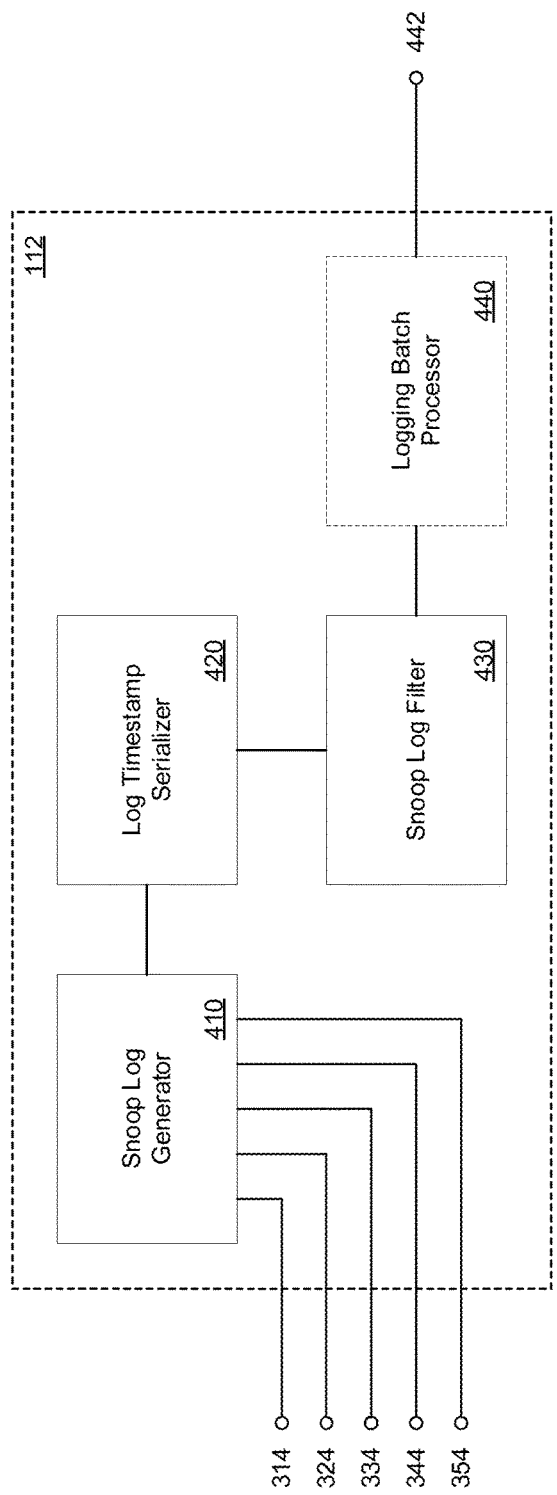
FIG. 4 illustrates an example debug record manager in accordance with the example system of FIG. 1.

FIG. 4 illustrates an example debug record manager in accordance with the example system of FIG. 1. As illustrated by way of example in FIG. 4, an example debug record manager 400 includes a snoop log generator 410, a log timestamp serializer 420, a snoop log filter 430, and a logging batch processor 440. In some implementations, the snoop log generator 410 is operatively coupled to one or more of the HCI log node 314, the BM log node 324, the LUTE log node 334, the WC log node 344, and the FIL log node 354. In some implementations, the logging batch processor 440 is operatively coupled to a debug logging node 442. Alternatively, in some implementations, the snoop log filter 430 is operatively coupled to the debug logging node 442 where the example debug record manager 400 does not include, is isolated from, bypasses, or the like, the logging batch processor 440. In some implementations, one or more of the HCI snoop filter 312, the BM snoop filter 322, the LUTE snoop filter 332, the WC snoop filter 342, and the FIL snoop filter 352 is operatively coupled to the timestamp input 108.

The snoop log generator 410 is operable to receive output from one or more of the HCI log node 314, the BM log node 324, the LUTE log node 334, the WC log node 344, and the FIL log node 354. In some implementations, the snoop log generator 410 is operable to combine, integrate, merge, associate, or the like, at least a subset of any HCI debug records, BM debug records, LUTE debug records, WC debug records, and FIL debug records. In some implementations, the snoop log generator determines, for a subset of HCI, BM, LUTE, WC and FIL debug records, common or repeated strings of bits within the debug records and replaces those bits with a short code and a dictionary which relates the short code to the string of bits which is common or repeated. In some implementations, the snoop log generator performs, for a subset of HCI, BM, LUTE, WC and FIL debug records, a lossless data compression function on the debug records. In some implementations, the data compression function includes, but is not limited to, Lempel Ziv Welch function, a Huffman encoding function, a run-length encoding function and an arithmetic encoding function. In some implementations, the snoop log generator 410 is operable to contemporaneously combine, integrate, merge, associate, or the like, at least a subset of any HCI debug records, BM debug records, LUTE debug records, WC debug records, and FIL debug records by latching, buffering, recording, or the like, output from the debug record generator 410. Thus, in some implementations, the snoop log generator 410 is operable to receive and process a volume of debug records generated by the debug record generator 110. In some implementations, the snoop log generator 410 includes one or more electrical components, electronic components, programmable electronic components, reprogrammable electronic components, integrated circuits, semiconductor devices, flip flops, arithmetic units, or the like.

The log timestamp serializer 420 is operable to serialize, sort, organize, or the like, one or more debug records concurrently with normal operation of the memory device. In some implementations, the log timestamp serializer 420 orders received debug records by one or more of timestamp, host command, device command, device identifier, and any hardware characteristic, software characteristic, device characteristic, system characteristic, or the like, associated with the storage device 100 or the system 114. In some implementations, the log timestamp serializer 420 compacts the timestamps of received debug records by determining the common most significant bits of the debug records, removing the common most significant bits from each record and creating a new debug record which records the common most significant bits. In some implementations, the log timestamp serializer 420 includes one or more electrical components, electronic components, programmable electronic components, reprogrammable electronic components, integrated circuits, semiconductor devices, flip flops, arithmetic units, or the like. The snoop log filter 430 is operable to receive and filter any debug records received from the log timestamp serializer 420. In some implementations, the snoop log filter 430 operates under snoop filter criteria similar to the HCI snoop filter 312. Thus, in some implementations, the snoop log filter 430 is operable to filter debug records in a centralized manner according to global or like criteria. It is to be understood that the snoop filter criteria associated with the snoop log filter 430 can differ from snoop log criteria associated with one or more of the snoop devices 310, 320, 330, 340 and 350. In some implementations, the snoop log filter 430 includes one or more electrical components, electronic components, programmable electronic components, reprogrammable electronic components, integrated circuits, semiconductor devices, flip flops, arithmetic units, or the like.

The logging batch processor 440 is operable to group, divide, organize, or the like, any set of debug records received from the log timestamp serializer 420, and to generate one or more debug record batches including one or more sets of debug records received from the log timestamp serializer 420. In some implementations, the logging batch processor 440 generates one or more debug record batches based at least on part on a characteristic of the memory array 106. As one example, the logging batch processor 440 can generate a debug log batch having a size within a transmission bandwidth restraint of the memory array 106. In some implementations, the logging batch processor 440 includes one or more electrical components, electronic components, programmable electronic components, reprogrammable electronic components, integrated circuits, semiconductor devices, flip flops, arithmetic units, or the like. It is to be understood that the example debug record manager 400 can optionally include one or more of the log timestamp serializer 420, the snoop log filter 430, and the logging batch processor 440. It is to be further understood that any of the snoop log generator 410, the log timestamp serializer 420, the snoop log filter 430, and the logging batch processor 440 can be directly or indirectly operatively coupled to the debug logging node 442 in response to the presence or absence of any devices or components of the example debug record manager 400.

Figure 5:
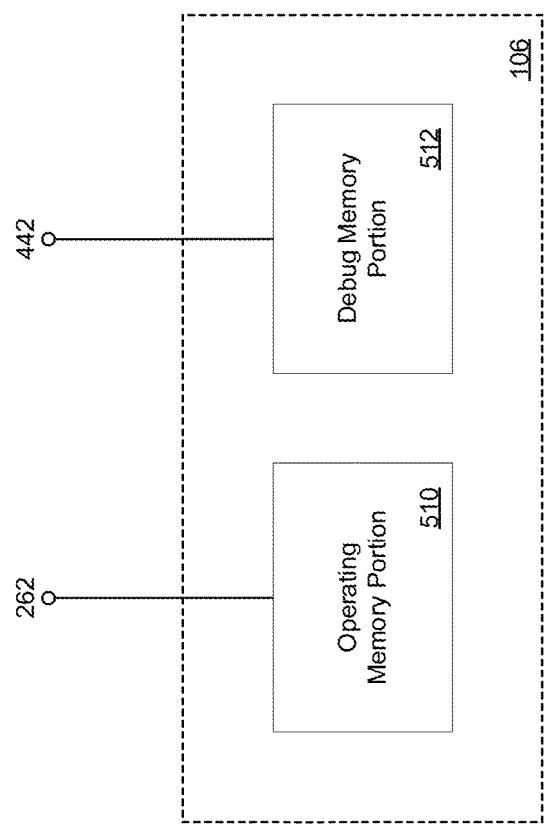
FIG. 5 illustrates an example memory array in accordance with the example system of FIG. 1.

FIG. 5 illustrates an example memory array in accordance with the example system of FIG. 1. As illustrated by way of example in FIG. 5, an example memory array 500 includes an operating memory portion 510 and a debug memory portion 512. In some implementations, the operating memory portion is operatively coupled to the operating memory node 262. In some implementations, the debug memory portion 512 is operatively coupled to the debug logging node 442. In some implementations, the memory array 106 includes the example memory array 500. In some implementations the operating memory portion 510 and the debug memory portion 512 include distinct logical areas of the memory device 106.

In some implementations, the operating memory portion 510 and the debug memory portion 512 include distinct physical areas of the memory device 106. In some implementations, the operating memory portion 510 and the debug memory portion 512 include distinct physical memory devices of the memory array 106. As one example, the operating memory portion 510 can be a first integrated circuit, the debug memory portion 520 can be a second integrated circuit, and the memory array 500 can be a printed circuit board or the like operatively coupling and packaging the operating memory portion 510 and the debug memory portion 512. In some implementations, one or more of the operation memory portion 510 and the debug memory portion 512 include contiguous logical or physical regions of one or more memory devices. In some implementations, one or more of the operating memory portion 510 and the debug memory portion 512 include memory devices in accordance with the memory array 106. In some implementations, one or more of the operating memory portion 510 and the debug memory portion 512 include one or more electrical components, electronic components, programmable electronic components, reprogrammable electronic components, integrated circuits, semiconductor devices, flip flops, arithmetic units, or the like.

Figure 6:
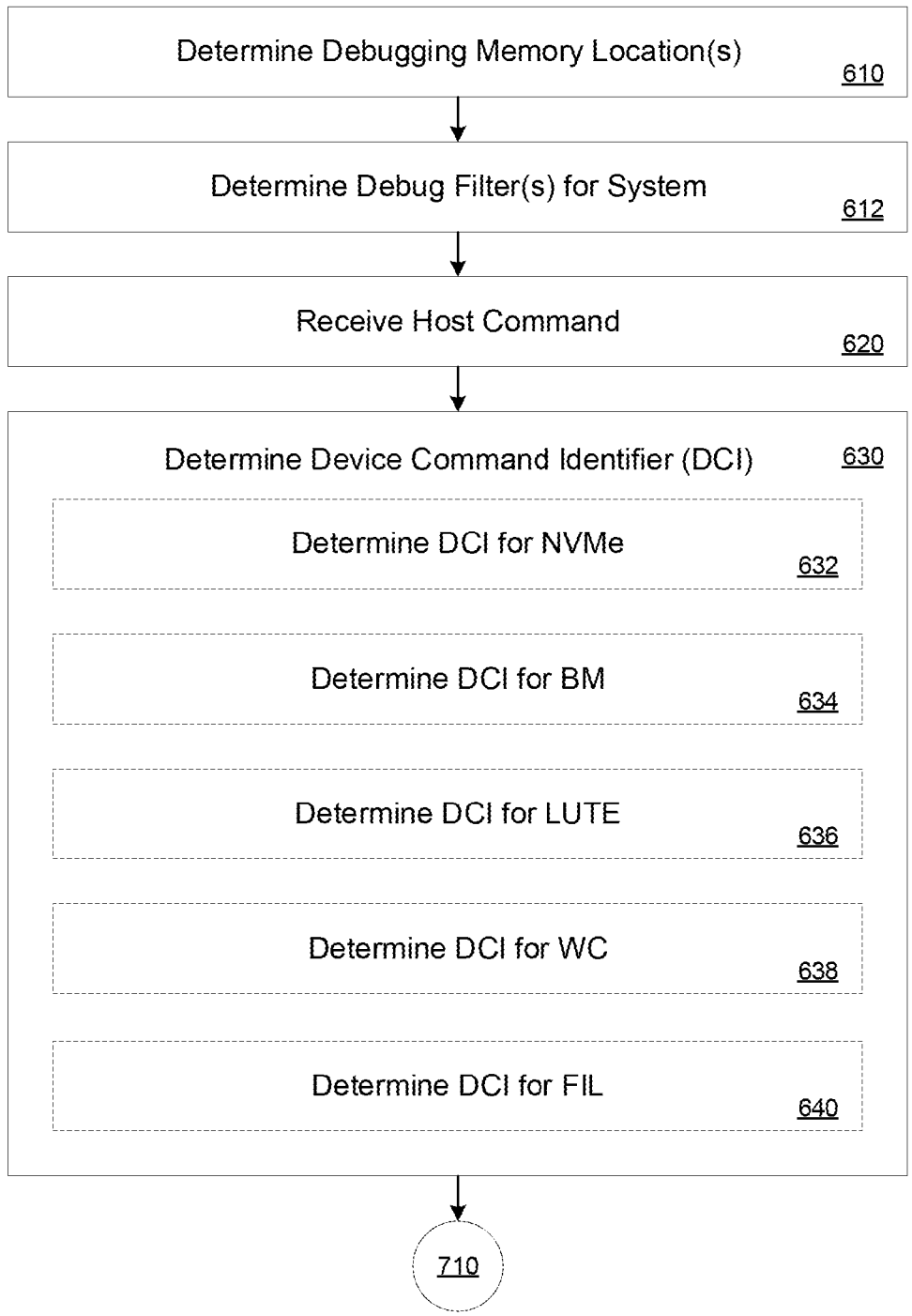
FIG. 6 illustrates an example method of high-performance memory debug record generation and management in accordance with present implementations.

FIG. 6 illustrates an example method of high-performance debug record generation and management in accordance with present implementations.

At step 610, the example system determines at least one debugging memory location. In some implementations, the example system receives one or more logical or physical addresses identifying one or more memory locations operable, configured, or the like, to receive one or more debug records, debug logs, debug log batches, and the like. In some implementations, the debugging memory location includes the debug memory portion 512. The method 600 then continues to step 612. At step 612, the example system determines one or more debug filters for the example system. In some implementations, one or more of the debug record generator 110 and the debug record manager 112 receives, obtains, or generates one or more debug filter criteria. In some implementations, one or more of the debug record generator 110 and the debug record manager 112 selects one or more debug filter criteria. The method 600 then continues to step 620.

At step 620, the example system receives a host command. In some implementations, the example system receives a host command associated with a memory access event. As one example, a memory access event includes, but is not limited to, a read operation from or a write operation to a memory array associated with the example system. In some implementations, the example system receives a host command associated with a memory operability event. As one example, a memory operability event includes, but is not limited to, a diagnostic, a self-test, application or removal of a security restriction on a particular memory address or range of addresses, and the like. The method 600 then continues to step 630.

At step 630, the example system determines a device command identifier (DCI) associated with the received host command. In some implementations, a DCI includes one or more device commands associated with one or more of the HCI 210, the BM 220, the LUTE 230, the WC 240, the FIL 250 and the FC 260. In some implementations, step 630 includes one or more of steps 632, 634, 636, 638 and 640. In some implementations, step 630 includes performing one or more of steps 632, 634, 636, 638 and 640 simultaneously, concurrently, in parallel, or the like. In some implementations, step 630 includes performing one or more of steps 632, 634, 636, 638 and 640 synchronously with each other, coordinated with each other, dependent on each other, or the like. In some implementations, step 630 includes performing one or more of steps 632, 634, 636, 638 and 640 asynchronously of each other, independently of each other, or the like. In some implementations, step 630 includes passively monitoring or passively receiving output from one or more of the HCI 210, the BM 220, the LUTE 230, the WC 240, the FIL 250 and the FC 260.

At step 632, the example system determines a DCI for the HCI 210. At step 634, the example system determines a DCI for the BM 220. At step 636, the example system determines a DCI for the LUTE 230. At step 638, the example system determines a DCI for the WC 240. At step 640, the example system determines a DCI for the FIL 250. The method then continues to step 710. It is to be understood that the example system is operable to determine a DCI based on any supported or supportable function of any of the HCI 210, the BM 220, the LUTE 230, the WC 240, the FIL 250 and the FC 260. It is to be further understood that example system is operable to determine a DCI based on any device or component of any of the HCI 210, the BM 220, the LUTE 230, the WC 240, the FIL 250 and the FC 260.

Figure 7:
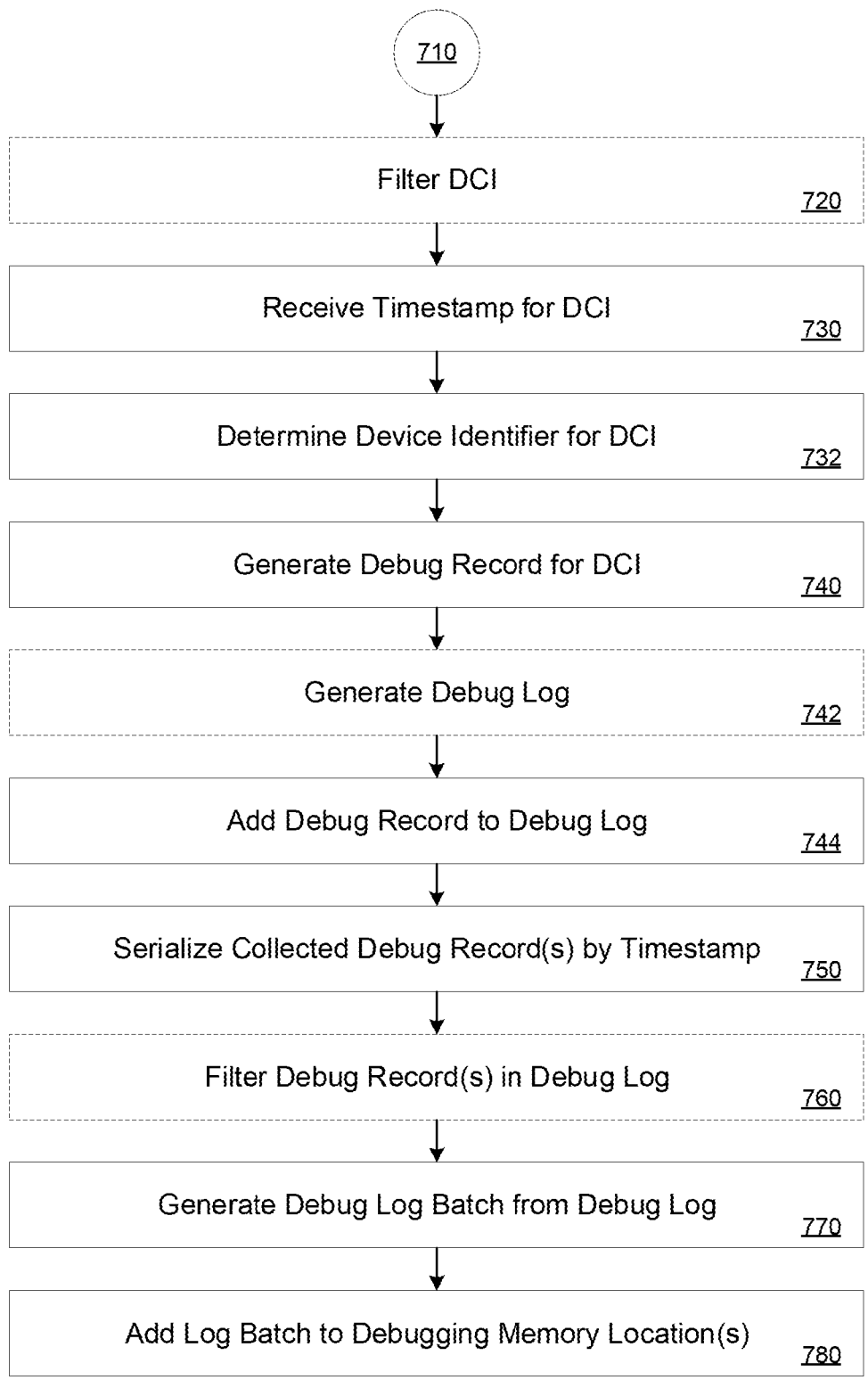
FIG. 7 illustrates an example method of high-performance memory debug record generation and management further to the example method of FIG. 6.

FIG. 7 illustrates an example method of high-performance debug record generation and management further to the example method of FIG. 6. In some implementations, at least one of the example storage device 100 and the example system 114 performs method 700 according to present implementations. In some implementations, the method 700 begins at step 710. The method 700 then continues to step 720.

At step 720, the example system filters the DCI based on the one or more debug filter criteria. In some implementations, one or more of the HCI 210, the BM 220, the LUTE 230, the WC 240, the FIL 250 and the FC 260 filter the DCI. It is to be understood that the example system can optionally filter the DCI in accordance with step 720. The method 700 then continues to step 730. At step 730, the example system receives a timestamp associated with the DCI. In some implementations, one or more of the HCI snoop device 310, the BM snoop device 320, the LUTE snoop device 330, the WC snoop device 340, the FIL snoop device 350, and the FC snoop device 360 receives the timestamp from the timestamp input 108. The method 700 then continues to step 732. At step 732, the example system determines a device identifier for the DCI. In some implementations, one or more of the HCI snoop device 310, the BM snoop device 320, the LUTE snoop device 330, the WC snoop device 340, the FIL snoop device 350, and the FC snoop device 360 determines a device identifier for the DCI, based on receiving input respectively from one of the HCI 210, the BM 220, the LUTE 230, the WC 240, the FIL 250 and the FC 260. The method 700 then continues to step 740.

At step 740, the example system generates a debug record for the DCI. In some implementations, one or more of the HCI snoop device 310, the BM snoop device 320, the LUTE snoop device 330, the WC snoop device 340, the FIL snoop device 350, and the FC snoop device 360 determines a device identifier for the DCI. In some implementations, one of more of the In some implementations, one or more of the HCI snoop device 310, the BM snoop device 320, the LUTE snoop device 330, the WC snoop device 340, the FIL snoop device 350, and the FC snoop device 360 at least temporarily generates and stores at least one debug record in a dedicated memory thereof. The method 700 then continues to step 742. At step 742, the example system generates a debug log. In some implementations, the snoop log generator 410 generates the debug log. It is to be understood that the example system can optionally generate the debug log if no log exists, if the example system receives or generates an instruction to replace an existing debug log, or the like. The method 700 then continues to step 744. At step 744, the example system adds the debug record to the debug log. In some implementations, the snoop log generator adds the debug record by appending the debug record to the debug log. In some implementations, the snoop log generator at least temporarily generates and stores at least one debug record in a dedicated memory thereof. The method 700 then continues to step 750.

At step 750, the example system serializes one or more collected debug records by timestamp. In some implementations, the log timestamp serializer 420 serializes the debug records. The method 700 then continues to step 760. At step 760, the example system filters one or more debug records associated with the debug log. In some implementations, the snoop log filter 430 filters the debug records associated with the debug log. It is to be understood that the example system can optionally filter the debug records in accordance with step 760. The method 700 then continues to step 770. At step 770, the example system generates a debug log batch file at least partially based on the debug log. In some implementations, the logging batch processor 440 generates the debug log batch file. It is to be understood that the example system can optionally generate the debug log batch file in accordance with step 770. The method then continues to step 780. At step 780, the example system adds the log batch to the debugging memory location. In some implementations, the logging batch processor 440 adds the log batch file by transmitting the log batch file to the memory array 106 or the debug memory portion 512 of the memory array 106. In some implementations, the method 700 ends at step 780.

Figure 8:
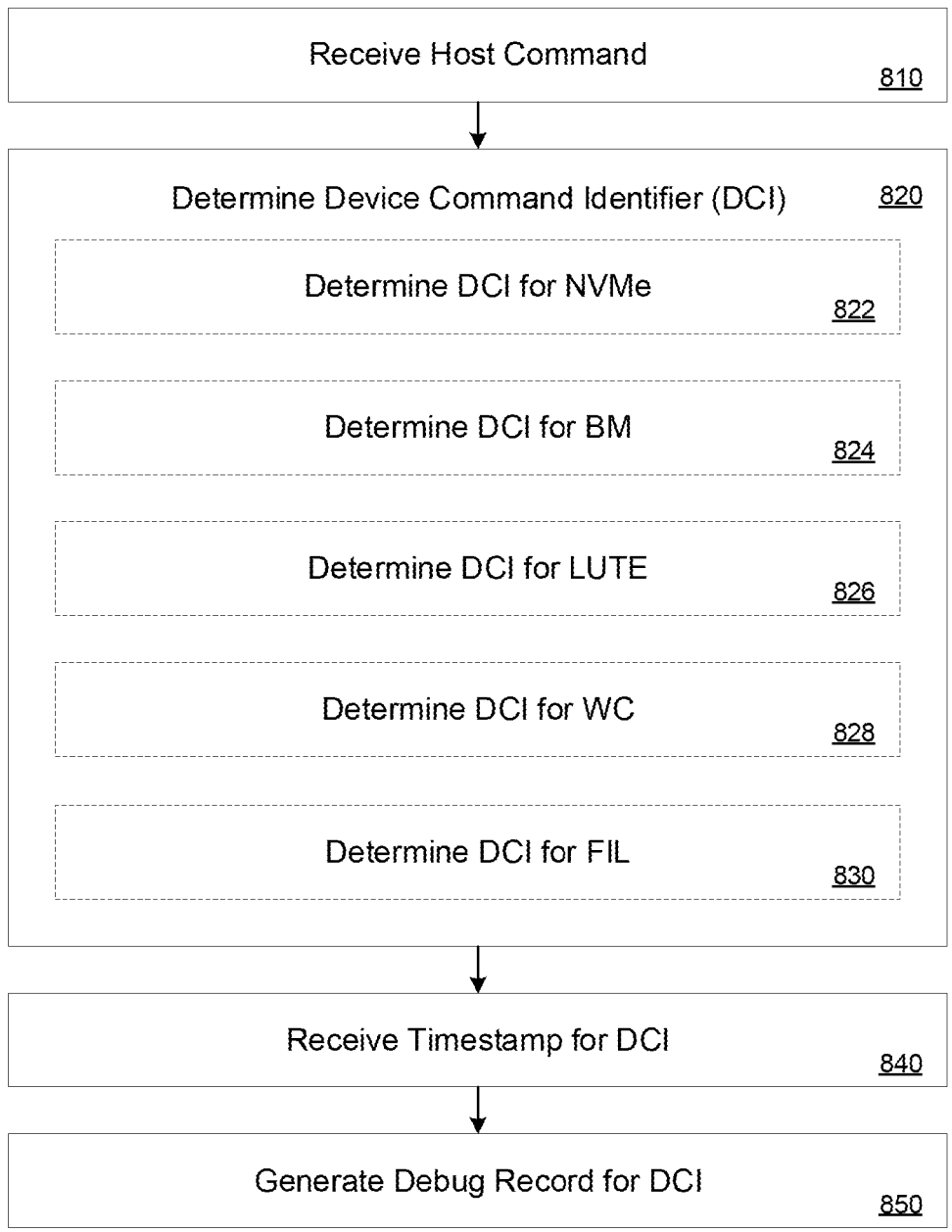
FIG. 8 illustrates a further example method of high-performance memory debug record generation and management in accordance with present implementations.

FIG. 8 illustrates a further example method of high-performance memory debug record generation and management in accordance with present implementations. In some implementations, at least one of the storage device 100 and the example system 114 performs method 800 according to present implementations. In some implementations, the method 800 begins at step 810.

At step 810, the example system receives a host command. In some implementations, the example system receives a host command in accordance with step 620. The method 800 then continues to step 820. At step 820, the example system determines a DCI. In some implementations, the example system determines a DCI in accordance with one or more of step 630. In some implementations, one or more of steps 822, 824, 826, 828 and 830 respectively correspond to steps 632, 634, 636, 638 and 640. The method 800 then continues to step 840. At step 840, the example system receives a timestamp associated with the DCI. In some implementations, the example system receives a timestamp in accordance with step 730. The method 800 then continues to step 850. At step 850, the example system generates a debug record associated with the DCI. In some implementations, the example system generates a debug record in accordance with step 740. In some implementations, the method 800 ends at step 850.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method executable on a memory device including a controller and a memory array, the method comprising:
   interpreting a host command to thereby identify one of a plurality of devices within the controller for performing actions corresponding to the host command, wherein the plurality of devices include at least first and second different devices respectively configured for performing first and second different actions;
   determining a device command associated with the host command and the identified one of the plurality of devices within the controller;
   receiving a device command timestamp corresponding to a time of the determining the device command; and
   determining a debug record contemporaneously with the determining the device command, the debug record including the host command, a device command identifier associated with the device command, and the device command timestamp.

2. The method of claim 1, further comprising:
   activating a snoop device corresponding to the device command;
   determining, by the corresponding snoop device, a filter condition associated with at least one of the memory controller device and the device command; and
   filtering by the corresponding snoop device, the determined device command in accordance with the filter condition and contemporaneously with the determining the device command.

3. The method of claim 2, wherein the determining the debug record further comprises generating the debug record in accordance with the first filter condition.

4. The method of claim 1, further comprising:
   determining a debug log including the debug record; and
   serializing the debug log according to the device command timestamp associated with the debug record.

5. The method of claim 4, further comprising:
   filtering the debug record from the debug log in accordance with the filter condition and contemporaneously with the determining the device command.

6. The method of claim 3, further comprising:
   generating a debug log batch including at least a portion of the debug log; and
   adding the debug log batch to a debug memory array.

7. The method of claim of 1, wherein the determining the device command further comprises receiving the device command in response to a memory access event.

8. The method of claim of 1, wherein the determining the device command further comprises receiving the device command in response to a memory operability event.

9. The method of claim 2, wherein the filter condition comprises a device bandwidth condition, and wherein the filtering the determined device command occurs at a rate satisfying the device bandwidth condition.

10. The method of claim 2, wherein the filter condition comprises a memory array condition, and wherein the filtering the determined device command occurs in accordance with a determination that a memory array location associated with the determined device command satisfies the memory array condition.

11. The method of claim 1, wherein determining the debug record comprises creating a single debug record that contains at least the host command identifier, the device command identifier, and the device command timestamp.

12. A device, comprising:
   a memory array;
   a memory controller device operably coupled to the memory array, the memory controller configured to interpret a host command to thereby identify one of a plurality of devices within the controller for performing actions corresponding to the host command, wherein the plurality of devices include at least first and second different devices respectively configured for performing first and second different actions, and configured to determine a device command associated with the host command and the identified one of the plurality of devices within the controller; and a debug record generator device operatively coupled to the memory controller device and configured to receive a device command timestamp corresponding to a time of the determined device command, and configured to determine a debug record contemporaneously with the determining the device command, the debug record including the host command identifier, a device command identifier associated with the device command, and the device command timestamp.

13. The device of claim 12, wherein the debug record generator device is further configured to determine a filter condition associated with at least one of the memory controller device and the device command, configured to filter the determined device command in accordance with the filter condition and contemporaneously with determining the device command, and configured to generate the debug record in accordance with the first filter condition.

14. The device of claim 12, further comprising:
a debug record manager device operably coupled to the debug record generator, configured to:
generate a debug log including the debug record,
serialize the debug log according to the device command timestamp associated with the debug record, and
filter the debug record from the debug log in accordance with the filter condition and contemporaneously with determining the device command.

15. The device of claim 14, further comprising:
a memory array device operably coupled to the debug record manager device and including a debug memory array,
wherein the debug record manager device is further configured to generate a debug log batch including at least a portion of the debug log, and configured to add the debug log batch to the debug memory array contemporaneously with determining the device command.

16. The device of claim of 12, wherein the memory controller device is further configured to determine the device command in response to a memory access event.

17. The device of claim 12, wherein the memory controller device is further configured to determine the device command in response to a memory operability event.

18. The device of claim 13, wherein the filter condition comprises a device bandwidth condition, and wherein the debug record generator device is further configured to filter the determined device command at a rate satisfying the device bandwidth condition.

19. The device of claim 13, wherein the filter condition comprises a memory array condition, and wherein the debug record generator device is further configured to filter the determined device command in accordance with a determination that a memory array location associated with the determined device command satisfies the memory array condition.

20. A non-transitory computer-readable medium storing computer-readable instructions, such that when executed, causes a processing circuit to:
interpret a host command to thereby identify one of a plurality of devices within the controller for performing actions corresponding to the host command, wherein the plurality of devices include at least first and second different devices respectively configured for performing first and second different actions;
determine a device command associated with the host command and the identified one of the plurality of devices within the controller;
receive a device command timestamp corresponding to a time of the determining the device command; and
determine a debug record contemporaneously with the determining the device command, the debug record including the host command identifier, a device command identifier associated with the device command, and the device command timestamp.

* * * * *